UNITED STATES PATENT OFFICE.

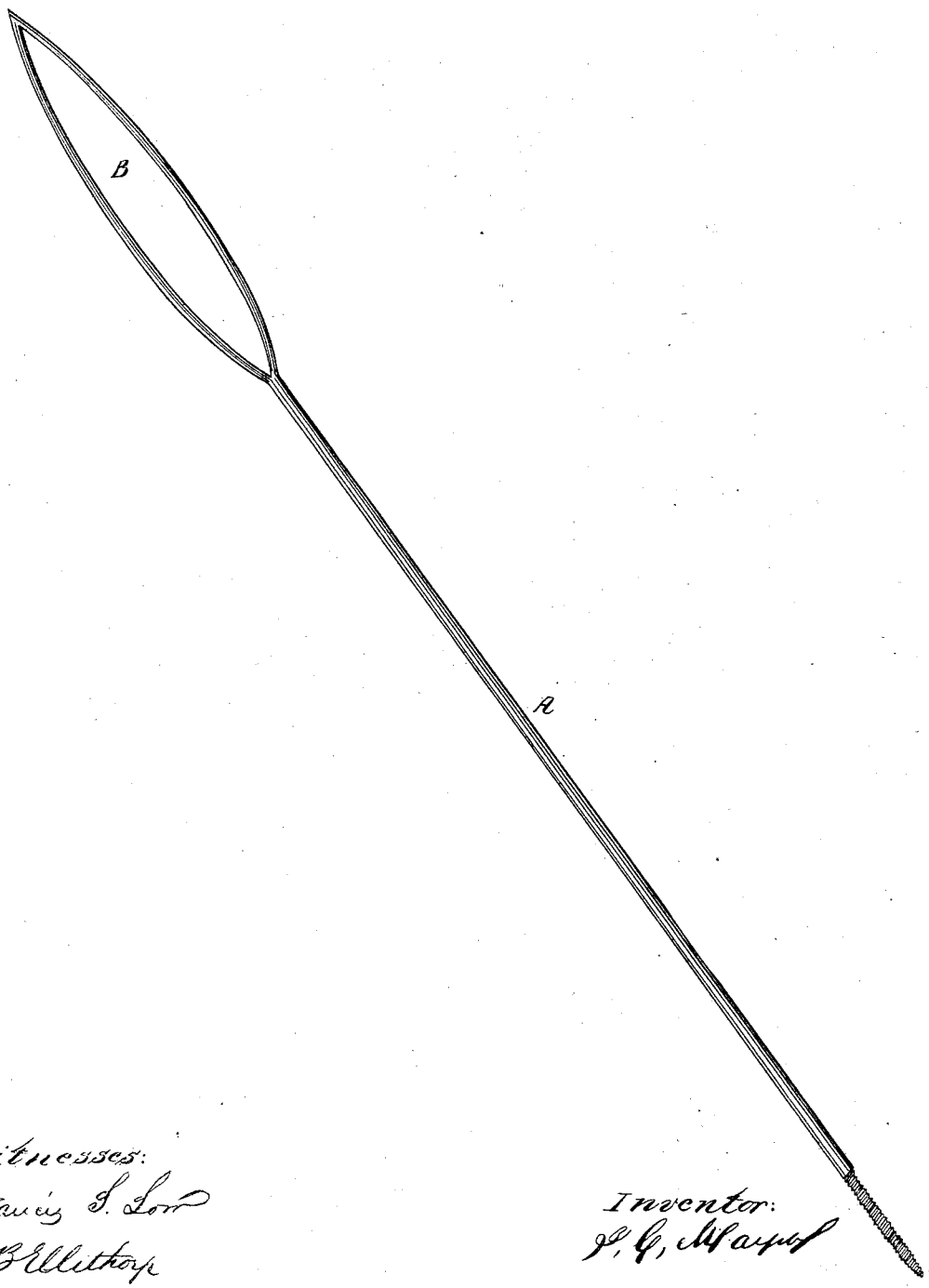

ISAAC C. MAYER, OF JERSEY CITY, NEW JERSEY.

MACHINE FOR TURNING SKINS.

Specification of Letters Patent No. 24,814, dated July 19, 1859.

*To all whom it may concern:*

Be it known that I, ISAAC C. MAYER, of Jersey City, in the county of Hudson and State of New Jersey, have invented a certain new and Improved Implement for Turning Skins Used by Furriers; and I do hereby declare that the following is a full and exact description of the same, reference being had to the accompanying drawing, and to the letters of reference marked thereon, showing a plan view of the implement.

The skins of all the smaller animals that are used by furriers for their fur, are taken off from the animals with the body part of them whole, by peeling or stripping them and turning them inside out, in which state they are dried. They require to be turned, to bring the fur side out, before they are cut up and used, which operation is now performed very slowly and laboriously by hand, as the skin becomes rigid and hard by drying, and can only be turned a small portion at a time, requiring considerable time, labor and expertness to complete it.

My improvement consists of an implement which is put into the body of the skin, and is constructed and operated as hereinafter described, by the use of which the operation is greatly expedited in time and lessened in labor.

A is the body of the implement, made of a rod of iron, and having a pointed screw cut upon its lower end by which it can be screwed into the side of a work-bench or ceiling, or into the floor to secure it, and hold it in position.

B is the head of the implement—made by welding another rod at each of its ends to the body, and then bending each of the rods forming the head into a bow shape as shown. The top of the head is pointed so as to enter and pass through a skin with facility.

The operation of turning a skin on the implement is effected as follows:—The top of the head of the implement is put into the hinder part of the body of the skin, and passed through it sufficiently far to allow the nose part of the skin to be inserted and drawn through the point of the opening at the top of the head; the skin is then taken on each side at the hinder part and turned down as quickly as the hands can be moved—the nose being secured prevents the skin from slipping off from the head of the implement except as it is turned inside out.

A skin can be turned by the use of this implement in about one tenth of the time that it can be in the ordinary manner, and the operation can be performed by any person without previous experience, while the ordinary method requires a person of experience, tact and expertness to perform it.

What I claim as my invention and desire to secure by Letters Patent, is—

The implement constructed and operated as herein described, for the purpose of turning the skins used by furriers as herein set forth.

I. C. MAYER.

Witnesses:
FRANCIS S. LOW,
SAMUEL C. MAYER.